(12) United States Patent
Wilson et al.

(10) Patent No.: US 10,485,391 B2
(45) Date of Patent: Nov. 26, 2019

(54) HINGE PIN FOR LAVATORY SEAT AND/OR LID

(71) Applicant: Alaska Airlines, Inc., Seattle, WA (US)

(72) Inventors: Darrel Wilson, Seattle, WA (US); Tad Klahn, Seattle, WA (US); Travis Smith, Seattle, WA (US); Tyler Buss, Seattle, WA (US)

(73) Assignee: Alaska Airlines, Inc., Seattle, WA (US)

( * ) Notice: Subject to any disclaimer, the term of this patent is extended or adjusted under 35 U.S.C. 154(b) by 603 days.

(21) Appl. No.: 14/504,346

(22) Filed: Oct. 1, 2014

(65) Prior Publication Data

US 2016/0095480 A1 Apr. 7, 2016

(51) Int. Cl.
*A47K 13/12* (2006.01)
(52) U.S. Cl.
CPC .................... *A47K 13/12* (2013.01)
(58) Field of Classification Search
CPC ........ A47K 13/12; A47K 13/24; A47K 13/26; E05Y 2900/614; Y10T 16/536075; Y10T 29/49963; Y10T 16/304; Y10T 16/546; Y10T 16/557; E05D 2005/102; E05D 2005/104; E05D 2005/106; E05D 2005/108; E05D 2005/122; E05D 2005/124; E05D 5/10; E05D 5/12; E05D 5/121; E05D 5/125; E05D 5/127; E05D 5/128; E05D 7/1005; F16B 31/021
(Continued)

(56) References Cited

U.S. PATENT DOCUMENTS

| 1,516,086 A | * | 11/1924 | Davidson | ................... | E05D 5/12 |
| | | | | | 16/380 |
| 1,833,890 A | * | 12/1931 | Carmichael | ............ | A47K 13/12 |
| | | | | | 4/236 |

(Continued)

FOREIGN PATENT DOCUMENTS

EP        1399050        1/2010

OTHER PUBLICATIONS

Beneke, "423, 523 Heavy Duty Sold Plastic Seats," http://dar.proflo.com/darmanager/Query?PRODUCT_ID=11244&USE_TYPE=SPECIFICATION (No date).

*Primary Examiner* — Erin Deery
*Assistant Examiner* — William R Klotz
(74) *Attorney, Agent, or Firm* — Klarquist Sparkman, LLP

(57) ABSTRACT

A hinge pin for pivotally mounting at least one of a toilet seat and a lid to a toilet or surrounding structure comprises a first hinge pin component, a second hinge pin component a linking member and fasteners. The first hinge pin component and the second hinge pin component each has a cylindrical outer end, a semicylindrical inner end with a flat joining surface and a shoulder between the outer end and the inner end. The linking member is semicylindrical and has a flat linking surface dimensioned to link the first hinge pin component and the second hinge component when they are axially aligned with their inner ends facing each other and the linking surface is in contact with each joining surface and secured by the fasteners. The assembled linking member and first and second hinge components define a center section of the hinge pin having a circular cross section.

5 Claims, 4 Drawing Sheets

(58) Field of Classification Search
USPC ...... 4/234–241; 16/262, 386, 261, 263, 365; D8/232, 326; 411/423
See application file for complete search history.

(56) References Cited

U.S. PATENT DOCUMENTS

| | | | | |
|---|---|---|---|---|
| 1,882,274 | A * | 10/1932 | Campus | A47K 13/26 4/236 |
| 1,942,510 | A * | 1/1934 | Freiberg | B42F 13/002 16/250 |
| 1,975,570 | A * | 10/1934 | Edgcumbe | A47K 13/12 16/365 |
| 2,069,756 | A * | 2/1937 | Glancy | A47K 13/12 16/386 |
| 2,787,006 | A * | 4/1957 | Young | A47K 13/12 16/342 |
| 4,145,767 | A | 3/1979 | Ibel | |
| 4,688,274 | A | 8/1987 | Grimstad | |
| 4,951,350 | A * | 8/1990 | Nunes | B60G 5/02 16/263 |
| 5,400,442 | A | 3/1995 | Pendlebury | |
| 5,918,322 | A * | 7/1999 | Yamamoto | A47K 13/26 4/248 |
| 6,071,034 | A * | 6/2000 | Cavagna | A47K 13/26 4/236 |
| 6,859,980 | B2 * | 3/2005 | Baer | E05D 3/022 16/250 |
| 7,281,276 | B2 * | 10/2007 | Vierkant, III | A47K 13/26 4/236 |
| 7,340,800 | B2 * | 3/2008 | Gulley | E05D 11/02 16/273 |
| 7,845,027 | B2 * | 12/2010 | Er | A47K 13/12 4/236 |
| 7,996,958 | B2 * | 8/2011 | Tang | G06F 1/1616 16/299 |
| 9,657,504 | B2 * | 5/2017 | Ramsauer | E05D 5/10 |
| 2004/0211211 | A1 * | 10/2004 | Nam | E05D 11/078 62/440 |
| 2012/0272477 | A1 * | 11/2012 | Mirick | E05D 11/00 16/274 |
| 2012/0317708 | A1 * | 12/2012 | Hand | A47K 13/12 4/236 |

* cited by examiner

HINGE PIN FOR LAVATORY SEAT AND/OR LID

FIELD

This application relates to toilets or lavatories, and in particular to a new hinge pin and for pivotally mounting the toilet seat and/or the toilet lid to the toilet or the structure surrounding the toilet.

BACKGROUND

Toilet seats, and where provided, toilet lids, are commonly mounted for easy pivoting between open and closed positions. Toilets provided in aircraft lavatories have generally the same design.

Some conventional aircraft toilets, however, are prone to unexpected service interruptions because the toilet seat hinge arrangement fails. For example, the conventional arrangement in an aircraft has hinge pins on either side of the toilet seat and lid, and these pins can wear and allow the seat and lid to migrate. If the seat or lid becomes detached from its mounts, or if the seat is loosened from its mounts and lacks stability, then aircraft passengers may not be permitted to use the toilet. In addition to inconvenience, in some cases such a service outage may cause a delay or cancellation of a flight, which poses high costs to the airline, the passengers and a number of other parties.

SUMMARY

Described below are implementations of a new hinge pin and methods for installing the hinge pin to pivotally couple at least one of a toilet seat and a toilet lid to the toilet or surrounding structure.

According to one implementation, a hinge pin for pivotally mounting at least one of a toilet seat and lid to a toilet or surrounding structure comprises a first hinge pin component, a second hinge pin component axially aligned with the first hinge pin component and a linking member configured to couple the first and second hinge pin components together.

The first and second hinge pin components and the linking member can define a cylindrical section when assembled together.

The hinge pin when assembled can comprise a center section having a first cross section and opposite ends defined by the first hinge pin and the second hinge pin, respectively, that have a second cross section, and the first cross section can be greater than the second cross section.

Each of the first and second hinge pin components can have a cylindrical end shaped for insertion from an inboard side into an opening in at least one of the toilet seat and the toilet lid.

The linking member can have a semicircular cross section and the first and second hinge pin components can have corresponding semicircular cross sections extending from their facing ends.

The first and second hinge pin components can each comprise a pivot section having a circular cross section and defining an end of the hinge pin, a joint section having a circular cross section greater than the circular cross section of the pivot section and a shoulder defined between the pivot section and the joint section.

The linking member can be sized to overlap each of the first and second hinge pin components when the hinge pin is assembled, and can further comprise fasteners connecting the linking member to each of the first and second hinge pin components. The fasteners can be threaded fasteners.

The linking member can have a flat surface and the first and second hinge pin components can each have an inner end with a flat joining surface, and wherein the flat surface of the linking member can be sized to extend over the joining surfaces of the first and second hinge pin components when the hinge pin components are aligned in an end-to-end relation.

The center section of the hinge pin can be sized larger than the opening in the at least one of the toilet seat and the toilet lid.

In another implementation, a hinge pin for pivotally mounting at least one of a toilet seat and a toilet lid to a toilet or surrounding structure comprises: a first hinge pin component having a cylindrical outer end, a semicylindrical inner end with a flat joining surface and a shoulder between the outer end and the inner end; a second hinge pin component having a cylindrical outer end, a semicylindrical inner end with a flat joining surface and a shoulder between the outer end and the inner end; a semicylindrical linking member with a flat linking surface dimensioned to link the first hinge pin component and the second hinge component when they are axially aligned with their inner ends facing each other and the linking surface in contact with each joining surface, wherein the assembled linking member and first and second hinge components define a center section of the hinge pin having a circular cross section; and a plurality of fasteners configured to couple the linking member to each of the first and second hinge pin components.

The shoulder of each of the first hinge pin component and the second hinge pin component can be axially spaced from the respective joining surface.

In some implementations, at least one of the toilet seat and the toilet lid is for attachment to a toilet or surrounding structure in an aircraft. In some implementations, at least one of the first hinge pin component, the second hinge pin component and the linking member is made of a stainless steel.

According to a method implementation, assembling at least one of a toilet seat and a toilet lid for pivotable movement relative to a toilet or surrounding structure can comprise inserting a first hinge pin component having a cylindrical end from an inboard side distally through a first opening in at least one of the toilet seat and toilet lid, inserting a second hinge pin component having a cylindrical end from an inboard side distally through a second opening in at least one of the toilet seat and toilet lid, the second opening being opposite and axially aligned with the first opening, positioning a linking member to overlap each of the first hinge pin component and the second hinge pin component, and coupling the linking member to the first hinge pin component and the second hinge pin component to form a one-piece hinge pin assembly.

Coupling the linking member to the first hinge pin component and the second hinge pin component can comprise securing the linking member to each of the first hinge pin component and second hinge pin component with threaded fasteners. Positioning the linking member to overlap each of the first hinge pin component and the second hinge pin component can comprise defining a center section of the hinge pin having a circular cross section greater than the size of the first opening and the second opening.

Methods can also include inserting a protruding end of the first hinge component in a first mount and inserting a protruding end of the second hinge pin component in a second mount, and securing the first mount and the second mount to the toilet or surrounding structure.

These and other features are described below in connection with the accompanying drawings.

DETAILED DESCRIPTION

Figure 1:
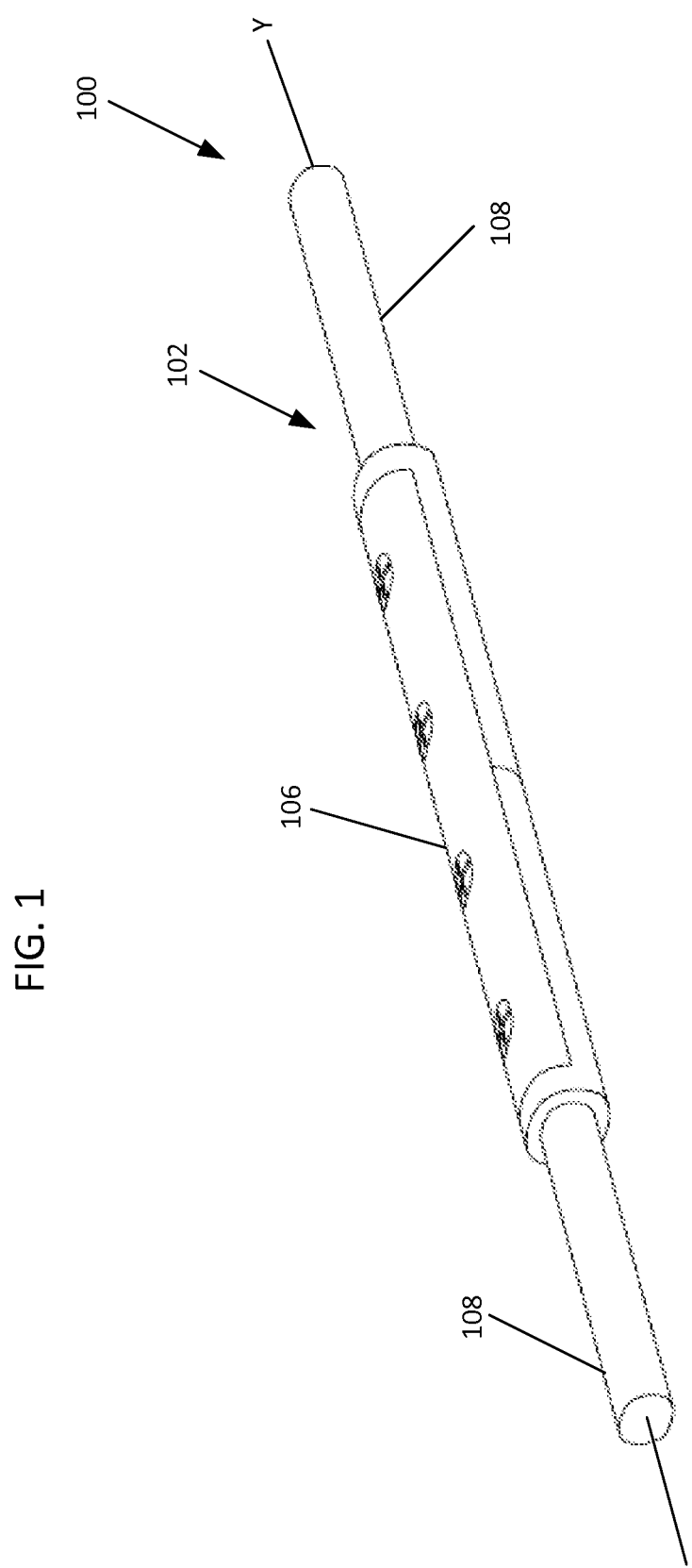
FIG. 1 is a perspective view of an exemplary hinge pin as assembled.

FIG. 1 shows an exemplary hinge pin 100 having an elongate body 102 defining a longitudinal axis Y with a center portion 106 having an enlarged cross section and two opposite ends 108 extending distally from the center portion 106 and having a reduced cross section.

Figure 2:
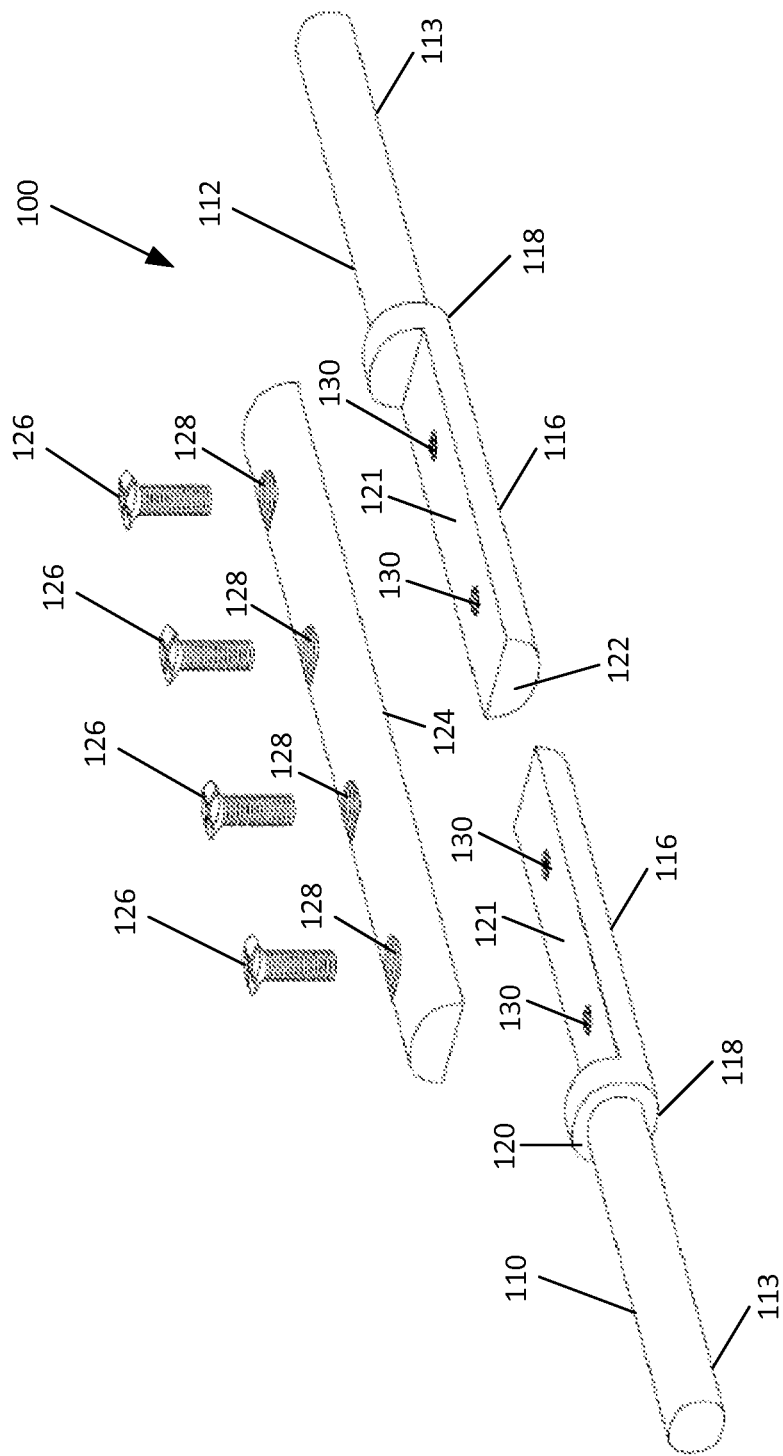
FIG. 2 is an exploded perspective view of the hinge pin of FIG. 1.

The hinge pin 100 can be formed from multiple components. For example, as best shown in FIG. 2, the hinge pin 100 can comprise a first component 110 and a second component 112 that are axially aligned with each other and are coupled together by an elongate linking member 124. Each component 110, 112 can have a generally cylindrical pivot section 113, a generally semi-cylindrical joint section 116 and a shoulder 118 defined at the junction of the pivot section 113 and the joint section 116. The shoulder 118 can have a distal end surface 120 extending perpendicular to the axis as shown, or this surface may be angled or curved.

Each joint section 116 can have an axially-extending joint surface 121 and an end surface 122. The surfaces 121, 122 can be generally flat as shown, or have another geometry. The linking member 124 can have a generally semi-circular cross section as shown to complement the joint sections 116 with which it overlaps when the joint sections are aligned axially and coupled together by the linking member 124. In the illustrated implementation, four threaded fasteners 126 extending through apertures 128 in the linking member 124 and aligned apertures 130 in the components 110, 112 to couple the assembly together. In the illustrated implementation, the linking member 124 is sized to have a length sufficient to fit within the aligned joint surfaces 121 when the end surfaces 122 are in contact with or minimally spaced apart from each other. As best shown in FIG. 1, the resulting center section 106 of the assembled hinge pin 100 can have a generally uniform circular cross section providing for easy rotation if needed and a finished appearance that is easy to maintain.

Other fastening arrangements are possible. In addition to the resulting circular cross section of the center section 106 as shown in the illustrated implementation, other cross sections can be used, including but not limited to an elliptical cross section or a polygonal cross-section.

The hinge pin 100 can be constructed of a stainless steel, which provides great strength, resists corrosion in moist environments and is easy to maintain. In one specific implementation, the ends 108 have a diameter of about 0.5 inch, with the center section 106 having a larger diameter. In one specific implementation, the overall length of the hinge pin is about 8.06 inches.

Figure 3:
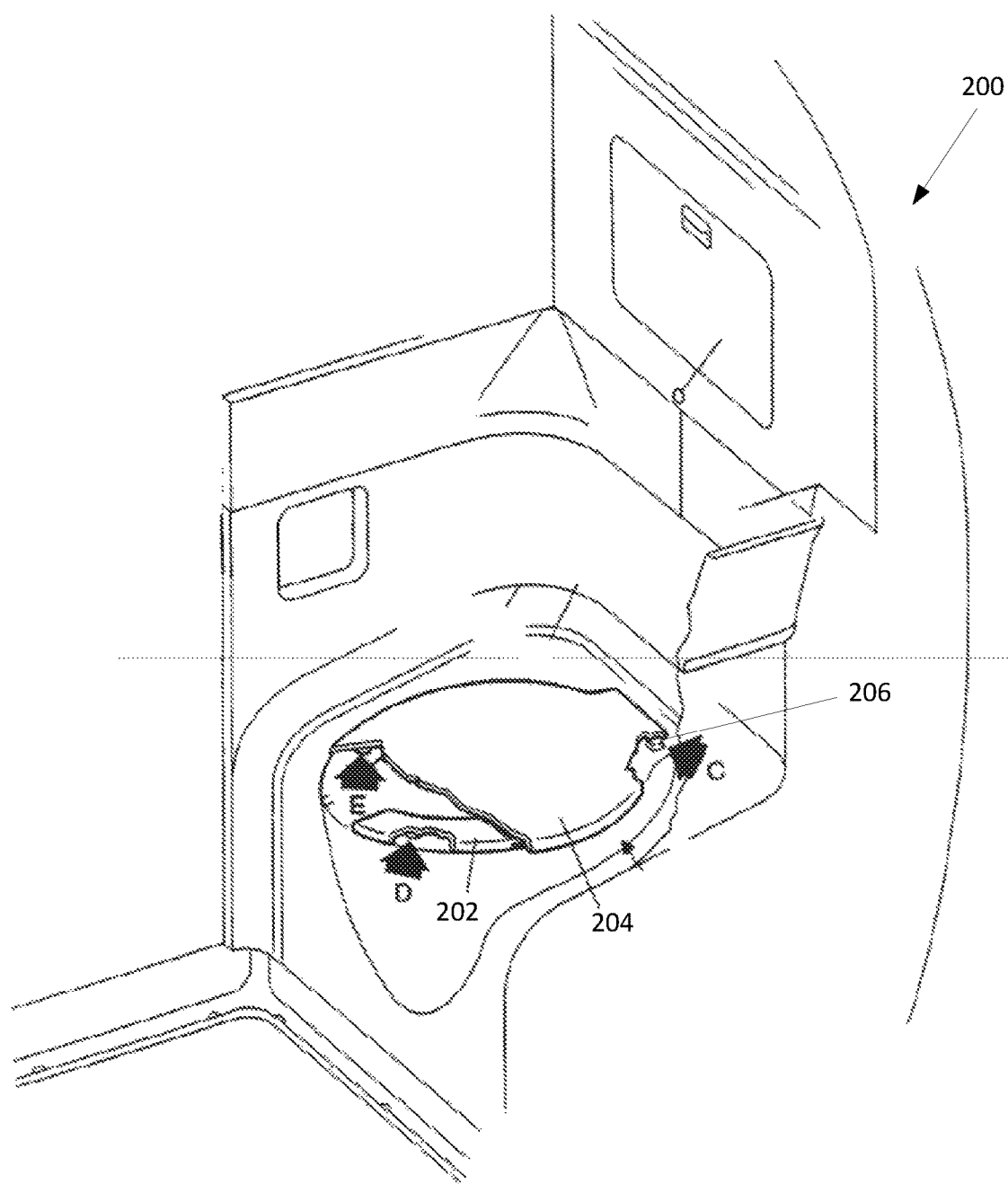
FIG. 3 is a perspective view of a toilet having a conventional hinge pin arrangement for pivotally attaching the toilet seat and lid to the toilet.
Figure 4:
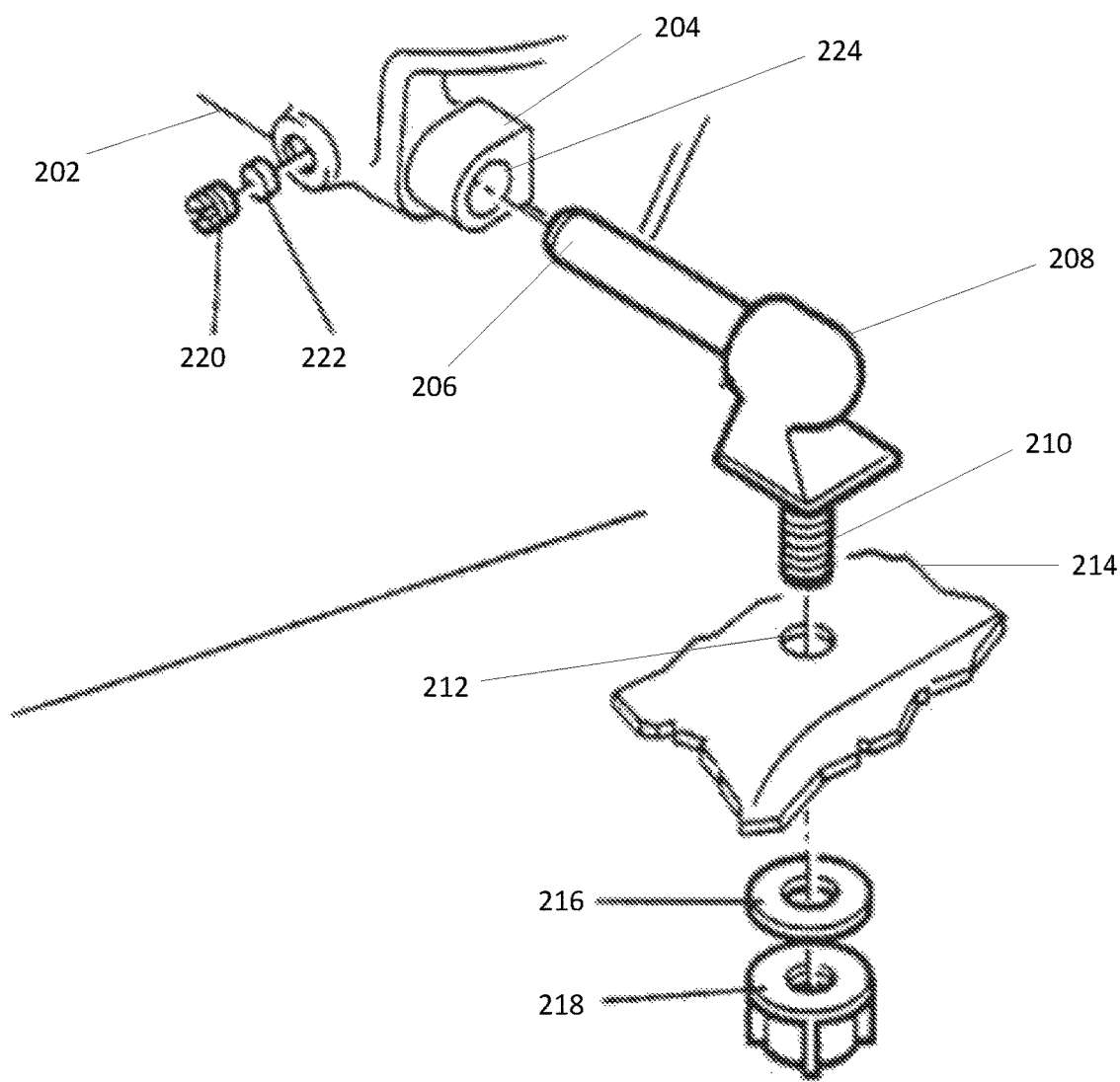
FIG. 4 is a detailed exploded perspective view taken at arrow C in FIG. 3 and showing a conventional right hinge pin in relation to the associated right side of the toilet seat, lid and mount from which the hinge pin extends.

FIG. 3 is a perspective view of a representative toilet 200 with a toilet seat 202 and lid 204 pivotally mounted using two separate conventional hinge pins, including a right hinge pin 206 as best seen in the detailed perspective view of FIG. 4. The right hinge pin 206 is slidably received in a right mount 208 having a threaded portion 210 extending downwardly and sized to extend through a through hole 212 in the toilet or surrounding structure 214. The threaded portion 210 is secured by a washer 216 and a nut 218. As also shown in FIG. 4, the toilet seat 202 is optionally further secured in place along the hinge pin 206 by a set screw 220 and member 222 that bear against the hinge pin 206 after it is inserted through the opening or hole 224 in the toilet lid 204 and an aligned hole in the toilet seat 202. Over time, however, the hinge pin 206 can wear, the set screw can loosen and/or other circumstance can occur that allowing the hinge pin 206 to migrate out of the toilet seat 202, the lid 204 or even the mount 208, tending to make the toilet seat and/or lid fit too loosely or to come apart unexpectedly, which is disadvantageous.

With the new hinge pin 100, however, these problems are greatly reduced. Rather than two separate hinge pins (such as the hinge pin 206) inserted from the outboard side, there is a single hinge pin 100 having components 110 and 112 inserted from the respective inboard sides and secured together by the linking member 124. The new hinge pin's configuration provides a single hinge pin, yet it is sized for assembly from inboard sides so that outboard sides need not have greater clearance to accommodate the longer length of the resulting single hinge pin.

In addition, when the components 110, 112 are installed with their ends 108 extending through the holes, the shoulders 118 that are sized larger than the holes abut against the seat 202/lid 204 on the inboard sides in the respective areas surrounding the holes to prevent the hinge pin 100 from migrating to the left and right. The ends 108 are received in respective mounts resembling the mount 208 and are attached to the toilet or surrounding structure in a similar manner. No set screw 220 and member 222 are necessary. Because fewer toilet seat problems arise, instances of downtime in aircraft toilet implementations are reduced, which leads to fewer disruptions in service and saves on costs. Overall product life is increased because of the robust construction of the hinge pin 100 compared to conventional hinge pins, some of which are made of plastic.

Directional term used herein, such as "upward," "downward," "upper," and "lower," are not absolute, and are used to provide information regarding relationships between components of the hinge pin 100, and are not necessarily indicative of the position of the components relative to the spatial environment.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A hinge pin for pivotally mounting at least one of a toilet seat or toilet lid to a toilet or surrounding structure, comprising:

first and second hinge pin components that are symmetrical to each other, each of the first and second hinge pin components having an inner end, an opposite outer end and a length extending along a longitudinal axis between the inner end and the outer end, wherein each of the first and second hinge pin components consists of a cylindrical pivot section extending longitudinally from the outer end and having a pivot section radius, a cylindrical shoulder positioned at the end of the pivot section and extending longitudinally, the cylindrical shoulder having a shoulder radius greater than the pivot section radius, and a semi-cylindrical joint section extending longitudinally from the cylindrical shoulder to the inner end, and wherein the semi-cylindrical joint section has a semi-circular cross-section with a joint section radius equal to the shoulder radius, the semi-cylindrical joint section having a flat side extending through the longitudinal axis with a width equal to twice the shoulder radius and an opposite curved side extending through an arc of 180 degrees; and a semi-cylindrical linking member having a semi-circular cross-section with a linking member radius, a linking member outer flat side having a width equal to twice the linking member radius and an opposite linking member outer curved side extending through an arc of 180 degrees, wherein the linking member is dimensioned to fit longitudinally between the first and second hinge pin components when the hinge pin is assembled with the respective inner ends of the first and second hinge pin components opposing each other and the respective flat sides of the first and second hinge pin components aligned with each other, the linking member outer flat side fitting against the respective flat sides of the first and second hinge pin components to thereby define a cylindrical outer hinge pin surface between the respective shoulders of the first and second hinge pin components, wherein the linking member comprises longitudinally spaced apertures and the joint sections of the first and second hinge components comprise corresponding threaded bores alignable with the apertures, the threaded bores being configured to receive threaded fasteners for securing the linking member to the first and second hinge components in the assembled position.

2. The hinge pin of claim 1, wherein the length of each of the first hinge component and the second hinge component is dimensioned to be less than a space separating protruding portions with openings in the toilet seat or toilet lid to allow each of the first and second hinge components to be positioned within the space and moved outwardly to extend the respective pivot section through a respective one of the openings.

3. The hinge pin of claim 2, wherein each shoulder is sized larger than the openings, and each pivot section is dimensioned to extend into one of the protruding portions and provide a pivot surface about which the toilet seat or toilet lid can pivot relative to the hinge pin.

4. The hinge pin of claim 1, wherein the first hinge pin component, the second hinge pin component and the linking member are made of stainless steel.

5. A method of assembling at least one of a toilet seat or a toilet lid for pivotable movement relative to a toilet or surrounding structure, comprising:

providing first and second hinge pin components that are symmetrical to each other, each of the first and second hinge pin components having an inner end, an opposite outer end and a length extending along a longitudinal axis between the inner end and the outer end, wherein each of the first and second hinge pin components consists of a cylindrical pivot section extending longitudinally from the outer end and having a pivot section radius, a cylindrical shoulder positioned at the end of the pivot section and extending longitudinally, the cylindrical shoulder having a shoulder radius greater than the pivot section radius, and a semi-cylindrical joint section extending longitudinally from the cylindrical shoulder to the inner end, and wherein the semi-cylindrical joint section has a semi-circular cross-section with a joint section radius equal to the shoulder radius, the semi-cylindrical joint section having a flat side extending through the longitudinal axis with a width equal to twice the shoulder radius and an opposite curved side extending through an arc of 180 degrees; and providing a semi-cylindrical linking member having a semi-circular cross-section with a linking member radius, a linking member outer flat side having a width equal to twice the linking member radius and an opposite linking member outer curved side extending through an arc of 180 degrees, wherein the linking member is dimensioned longitudinally to fit between the first and second hinge pin components when the hinge pin is assembled with the respective inner ends of the first and second hinge pin components opposing each other and the respective flat sides of the first and second hinge pin components aligned with each other, the linking member outer flat side fitting against the respective flat sides of the first and second hinge pin components;

inserting the outer end and pivot section of the first hinge pin component from a first opening inboard side distally through a first opening in the toilet seat and/or toilet lid until the respective shoulder prevents further insertion;

while the first hinge pin component is positioned in the first opening, inserting the outer end and pivot section of the second hinge pin component from a second opening inboard side distally through a second opening in the toilet seat and/or toilet lid, the second opening being spaced apart from, axially aligned with and opposite the first opening, until the respective shoulder prevents further insertion, the second hinge pin component being axially aligned with the first hinge pin component;

rotating the first and second hinge pin components relative to each other such that the respective flat sides are aligned with each other;

positioning the linking member to overlap the aligned flat sides of the first hinge pin component and the second hinge pin component, to extend between the shoulders, with the linking member outer flat side fitting against the flat sides of the first and second hinge pin components, wherein the linking member and the first and second hinge pin components together define a cylindrical outer hinge pin surface with a circular cross-section between the shoulders; and coupling the linking member to the first hinge pin component and the second hinge pin component with threaded fasteners to secure the hinge pin components and toilet seat and/or toilet lid in place.

* * * * *

UNITED STATES PATENT AND TRADEMARK OFFICE
CERTIFICATE OF CORRECTION

PATENT NO. : 10,485,391 B2
APPLICATION NO. : 14/504346
DATED : November 26, 2019
INVENTOR(S) : Wilson et al.

Page 1 of 1

It is certified that error appears in the above-identified patent and that said Letters Patent is hereby corrected as shown below:

On the Title Page

Item (57), In the Abstract:
Line 3, "component a" should read --component, a--.

Signed and Sealed this
Seventh Day of September, 2021

Drew Hirshfeld
*Performing the Functions and Duties of the
Under Secretary of Commerce for Intellectual Property and
Director of the United States Patent and Trademark Office*